UNITED STATES PATENT OFFICE.

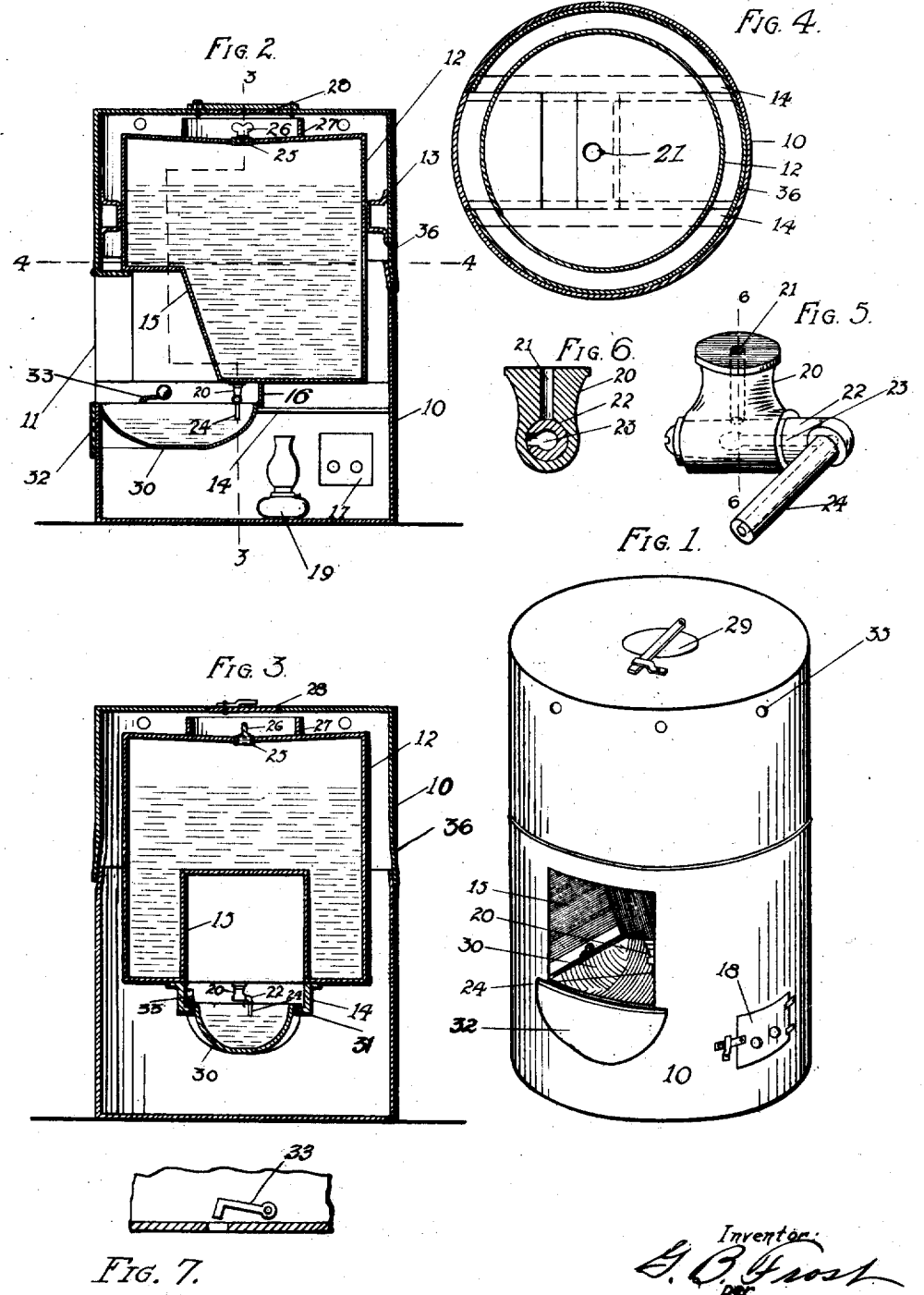

GEORGE B. FROST, OF DES MOINES, IOWA.

STOCK-WATERING TANK.

1,257,211.  Specification of Letters Patent.  Patented Feb. 19, 1918.

Application filed May 26, 1917. Serial No. 171,308.

*To all whom it may concern:*

Be it known that I, GEORGE B. FROST, a citizen of the United States, and resident of Des Moines, in the county of Polk and State of Iowa, have invented a certain new and useful Stock-Watering Tank, of which the following is a specification.

The object of my invention is to provide a stock watering tank of simple, durable and inexpensive construction.

A further object is to provide a tank of the kind mentioned having an outer receptacle and an inner spaced tank with a compartment below the spaced tank for a heating element, and provided with a slidable, removable drinking trough below the tank and connected therewith by an outlet tube extending downwardly in the trough for providing a water seal, said tube being jointed, and being operatively connected with a valve whereby the withdrawal of the watering trough automatically closes said valve, and prevents the further discharge of water from the tank.

It is in general a further object to provide a trough which can be heated, and which is also readily and easily cleanable, so that it is healthful and sanitary, whereby the water may be kept clean and wholesome, so that animals using the trough will drink more nearly the amount of water required by nature for health and vigor and will make the most economic gains with the ration provided.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view of a stock watering tank, embodying my invention.

Fig. 2 shows a vertical, sectional view through the same.

Fig. 3 shows a vertical, sectional view taken on the line 3—3 of Fig. 2.

Fig. 4 shows a horizontal, sectional view taken on the line 4—4 of Fig. 2.

Fig. 5 shows a perspective view of the valve and discharge tube.

Fig. 6 shows a sectional view taken on the line 6—6 of Fig. 5, and

Fig. 7 shows a vertical, sectional view through one of the flanges of the trough showing the locking device for coöperating therewith.

My improved device comprises an outer receptacle preferably in the form of a cylinder, indicated by the reference character 10. In what I shall call the front of the outer receptacle is an opening 11.

Received within the upper portion of the receptacle is a water tank 12. Suitable spacing devices 13 are provided for spacing the tank 12 away from the walls of the receptacle 10.

Extending across the lower portion of the receptacle 10 from front to rear are spaced supporting members 14 substantially Z-shaped in cross section, as illustrated in Fig. 3. The tank 12 rests upon the supporting members 14. The tank 12 is provided opposite the opening 11 with an inset portion 15 to permit access to the head of an animal.

Below the tank 12 and extending transversely of the device, between the supporting members 14, is a partition 16 for preventing the escape of heat. In the lower part of the wall of the receptacle 10 is a suitable opening 17, designed to be closed by a proper closure device 18.

In the compartment formed below the tank 10 is a heating element 19 of any suitable kind.

Communicating with the lower interior of the tank 12 is a fitting 20, in which is a valve. The fitting 20 has a vertical opening 21, which communicates at its lower end with a cylindrical opening in which is rotatably mounted the valve member 22, which is provided with a passage 23, shown by dotted lines in Fig. 5, and extending from its outer end to position adapted to register with the lower end of the passage 21 in one position of the valve member 22.

Screwed on to the outer end of the member 22 is a tube 24 designed to hang downwardly when the valve is open.

The upper end of the top of the tank 12 is preferably inclined slightly downwardly from its periphery to its center and is provided at its center with an opening 25 adapted to be closed by a screw plug 26, for making the water tank air tight. Extending upwardly from the top of the tank 12 is an annular ring 27, surrounding the plug 26, as shown in Fig. 2, and adapted to serve as a funnel member in filling the tank 12.

In the top of the receptacle 10, above the central portion of the tank 12 is an opening 28 adapted to be closed by a suitable closure device 29.

I provide a removable drinking trough 30, having at its upper side edges laterally extending flanges 31, clearly illustrated in Fig. 3, adapted to slide and be supported upon the opposite inwardly extending flanges at the lower edges of the supporting members 14, as shown in said Fig. 3.

The trough 30 is provided with a downward extension 32 secured to its outer end and extending downwardly and designed, when the trough is installed in the receptacle 10, to form part of the front wall of said receptacle and overlap the wall of the receptacle 10 below the opening 11, as illustrated in Figs. 1 and 2.

Pivoted to the wall of the receptacle 10 above one of the flanges 31 is a hook device 33 adapted in one position of its movement to enter a hole in the flange 31 to hold the trough 30 against removal from the receptacle 10.

The parts are so arranged that when they are assembled in the completed watering tank, the tube 24 extends downwardly into the trough 30, and the upper edge of the wall of the trough 30 is just below the level of the fitting 20. The parts are thus so arranged that when the member 33 is moved to inoperative position the trough 30 may be slid outwardly and during its sliding movement its rear wall will engage the tube 24, swinging the tube upwardly and forwardly, as illustrated for instance in Fig 5, thereby closing the valve, so that when the trough 30 is withdrawn from the receptacle 10, the valve will be closed and no water can escape into the compartment below the tank 12. The trough 30 may thus be easily removed and cleaned.

At the same time when in use it is located within the outline of the receptacle 10 where it will be subject to the heat from the heating element 19, and where it will be difficult for animals, such as hogs or the like, to get filth or dirt into such trough.

In the upper portion of the wall of the receptacle 10 are suitable ventilating openings 35.

The receptacle 10, may, if desired, be made of two parts comprising upper and lower members, the upper member resting directly on the lower member, with ends overlapped like joints of stove pipe.

The advantages of my improved watering tank may be largely seen from the foregoing description.

It would be easy to make the trough 30 longer, and to provide suitable openings for permitting animals to drink on more than one side of the tank.

It will be noted that the water trough is located within the outlines of the receptacle 10, so that it is not exposed to passing drafts of air.

The trough may be quickly and easily removed for cleaning, and its removal automatically closes the valve for shutting off the flow of water from the tank 12. The tube 24 extends downwardly into the trough 30, so that when the water from the tank 12 flows downwardly through the fitting 20, and the tube 24 into the trough 30, such flow will cease when the level of the water in the trough 30 reaches the lower or discharge end of the tube 24.

As the animals drink from the trough 30 and tend to lower the water, the water will be automatically maintained at a level at the lower end of the tube 24.

Some changes may be made in the construction and arrangement of the various parts of my water tank, and it is my intention to cover by the claims of the patent to be issued upon this application, any modified forms of structure or use of mechanical equivalents which may be reasonably included within the scope of my claims.

I claim as my invention—

1. In a device of the class described, the combination of an outer receptacle, having an opening in its wall, an inner tank spaced from the side walls and the bottom of said receptacle, a trough mounted to slide inwardly and outwardly through said opening below said tank, said receptacle having below said tank and trough a compartment for holding the heater, whereby the trough may be located within the area of the receptacle, means for conducting water from the bottom of said tank to said trough, said means including a valve, and a movable controlling member therefor, forming a water conducting means, and designed to normally extend into the trough for forming a water seal, and adapted when said trough is slid out of said receptacle to be engaged by the trough wall, and moved to position for closing said valve.

2. In a device of the class described, an outer receptacle having an opening in its front wall, a tank received in the upper portion of said receptacle spaced from the walls thereof, supporting members below said tank, spaced from each other, and extending from said opening across said receptacle, said supporting members having at their lower edges opposite inwardly extending flanges, a trough having flanges adapted to be slidably mounted on said first flanges, said trough being adapted in one position to rest within said receptacle, a partition between said supporting members arranged to be adjacent to the rear end of the trough when the trough is within said receptacle, means for conducting fluid from said tank to said trough, said means including a valve with a movable member having a tube extending downwardly when the valve is open, said tube being adapted to be engaged by said trough when the trough is moved outwardly for moving the valve to closed position.

Des Moines, Iowa, April 16, 1917.

GEORGE B. FROST.

Copies of this patent may be obtained for five cents each, by addressing the "Commissioner of Patents, Washington, D. C."